(12) United States Patent
Callway et al.

(10) Patent No.: US 6,279,067 B1
(45) Date of Patent: Aug. 21, 2001

(54) METHOD AND APPARATUS FOR DETECTING INTERRUPT REQUESTS IN VIDEO GRAPHICS AND OTHER SYSTEMS

(75) Inventors: Edward G. Callway, Toronto; Oscar Y. C. Chiu, Markham, both of (CA)

(73) Assignee: ATI International SRL, Christchurch (BB)

(*) Notice: Subject to any disclaimer, the term of this patent is extended or adjusted under 35 U.S.C. 154(b) by 0 days.

(21) Appl. No.: 09/231,394

(22) Filed: Jan. 13, 1999

(51) Int. Cl.[7] .......................... G06F 13/24; G06F 13/26; G06F 13/32
(52) U.S. Cl. .................... 710/260; 710/261; 710/262; 710/263; 710/264; 710/265; 710/266; 710/267; 710/268; 710/269
(58) Field of Search .................... 710/260–269, 710/220, 109

(56) References Cited

U.S. PATENT DOCUMENTS

| | | | |
|---|---|---|---|
| 4,631,670 | * 12/1986 | Bradley et al. | 710/264 |
| 4,768,149 | * 8/1988 | Konopik et al. | 710/47 |
| 5,548,762 | * 8/1996 | Creedon et al. | 710/260 |
| 5,634,130 | * 5/1997 | Lee | 710/260 |

* cited by examiner

*Primary Examiner*—Rupal Dharia
(74) *Attorney, Agent, or Firm*—Markison & Reckamp, P.C.

(57) ABSTRACT

A method and apparatus for detecting an interrupt request in a video graphics or other system are accomplished by reading or polling a shared interrupt request flag stored in one of multiple potentially interrupting devices and determining whether a pending interrupt request exists based on a status of the shared interrupt request flag. In the event that a pending interrupt request exists, a notification of the pending interrupt request is provided to an interrupt service routine. In the event that a pending interrupt request does not exist the circuitry that is reading or polling the shared interrupt request flag delays for a polling interval and then repeats reading or polling the shared interrupt request flag and determining whether a pending interrupt request exists. By reading or polling the shared interrupt request flag of a single potentially interrupting device at predetermined intervals of time, the system is able to detect whether any one of the potentially interrupting devices is asserting an interrupt request.

22 Claims, 4 Drawing Sheets

METHOD AND APPARATUS FOR DETECTING INTERRUPT REQUESTS IN VIDEO GRAPHICS AND OTHER SYSTEMS

FIELD OF THE INVENTION

The invention relates generally to detection of interrupt requests and particularly to detection of interrupt requests in a video graphic system that utilizes a video interface port.

BACKGROUND OF THE INVENTION

An increasing number of digital video devices are being developed for use in a variety of applications. Some of these digital video devices include digital video disk (DVD) players, video conferencing systems, and circuits that support enhanced television displays. The circuitry developed to support these digital video devices include graphics display adapters, which process digital video images for display on display devices such as television sets, monitors, and flat panel displays.

In order to allow a variety of digital video devices to be able to connect to and communicate with the graphics display adapters, a video interface port (VIP) standard has been developed to ensure compatibility between different manufacturers. The VIP standard is developed and overseen by the Video Electronics Standards Association (VESA). One of the areas of standardization that the VIP standard provides is in the area of interrupt request servicing. Interrupt requests are generated by digital video devices, or VIP "slave" devices, when they require servicing by the graphics display adapter, or VIP "host".

For example, when a VIP slave such as an MPEG data decoder receives a large amount of data that it needs to relay to the graphics display adapter for display, and does not receive enough memory bandwidth to do so, it may assert an interrupt request. The interrupt request notifies the host central processing unit (CPU) that the MPEG data decoder requires attention. Typically, an interrupt service routine (ISR) within the graphics display adapter will receive the interrupt request and service the MPEG decoder such that system performance is maintained.

Prior art systems provide a hardware connection dedicated to interrupt requests between the digital video devices, or VIP slaves, and the graphics display adapter, or VIP host device. In most cases, the interrupt request signals from all of the VIP slaves in a particular system are merged to provide a single interrupt request signal to the VIP host. This technique is shown in the prior art video graphics system illustrated in FIG. 1. As can be seen in FIG. 1, the first and second VIP slaves are able to assert a shared VIP interrupt request (IRQ) line to the VIP host module. Once the VIP interrupt request line has been asserted, the host CPU must determine which of the VIP slaves has asserted the interrupt request and then service that VIP slave using the VIP bus.

VIP hosts and VIP slaves are typically implemented as separate integrated circuits or groups of integrated circuits and other components. Because of this, one of the drawbacks of the prior art system illustrated in FIG. 1 is the need for the VIP host to have a dedicated pin to receive the interrupt request signal. VIP hosts are often integrated circuits that have a limited number of pins available, and the requirement to have one or more pins dedicated to the receipt of VIP interrupt requests is undesirable.

Other prior art solutions merge the VIP interrupt requests with other interrupt requests such as from the graphics controller and present the merged VIP interrupt request to the CPU via bus structures such as the peripheral component interconnect (PCI) bus or an accelerated graphics port (AGP) bus. Unfortunately, these solutions create additional overhead as the interrupt service routine that services the interrupt request cannot easily determine whether the interrupt was sourced by a VIP slave or by other interrupting entities which are coupled to the bus. Once the interrupt service routine has determined that a VIP slave has asserted the interrupt request, additional processing power must be expended by the CPU to determine which of the VIP slaves has asserted the interrupt. If the interrupt service routine is unable to quickly determine which VIP slave has asserted the interrupt request, the delay incurred and the processing power consumed in determining the source of the interrupt request may cause degradation in system performance.

Therefore, a need exists for a method and apparatus that allows for detection of interrupt requests that does not require a dedicated pin and can be performed without degrading overall system performance.

DETAILED DESCRIPTION OF A PREFERRED EMBODIMENT OF THE INVENTION

Generally, the present invention provides a method and apparatus for detecting an interrupt request in a video graphics system. This is accomplished by reading a shared interrupt request flag stored in a device, which is preferably a VIP slave device. Once the shared interrupt request flag has been read, it is determined whether the shared interrupt flag is set. When the shared interrupt flag is set, a pending interrupt request exists, and notification of the pending interrupt request is forwarded to an interrupt service routine. If the shared interrupt request flag is not set, the circuitry which is polling the interrupt request flag delays for a polling interval and then repeats the steps of reading the shared interrupt request flag and determining whether it is set. By reading the shared interrupt request flag at predetermined intervals of time, the polling system is able to detect when a pending interrupt request exists without the need for a dedicated hardware connection between the polling and interrupting devices. Because the circuitry required to poll the interrupt request flag is minimal, it can be implemented external to the main processor of a system. Implementing the polling circuitry in separate circuitry, such as a state machine, ensures that the main processor will not be overburdened by having to repeatedly perform the polling, thus minimizing its impact on overall system performance.

Figure 1:
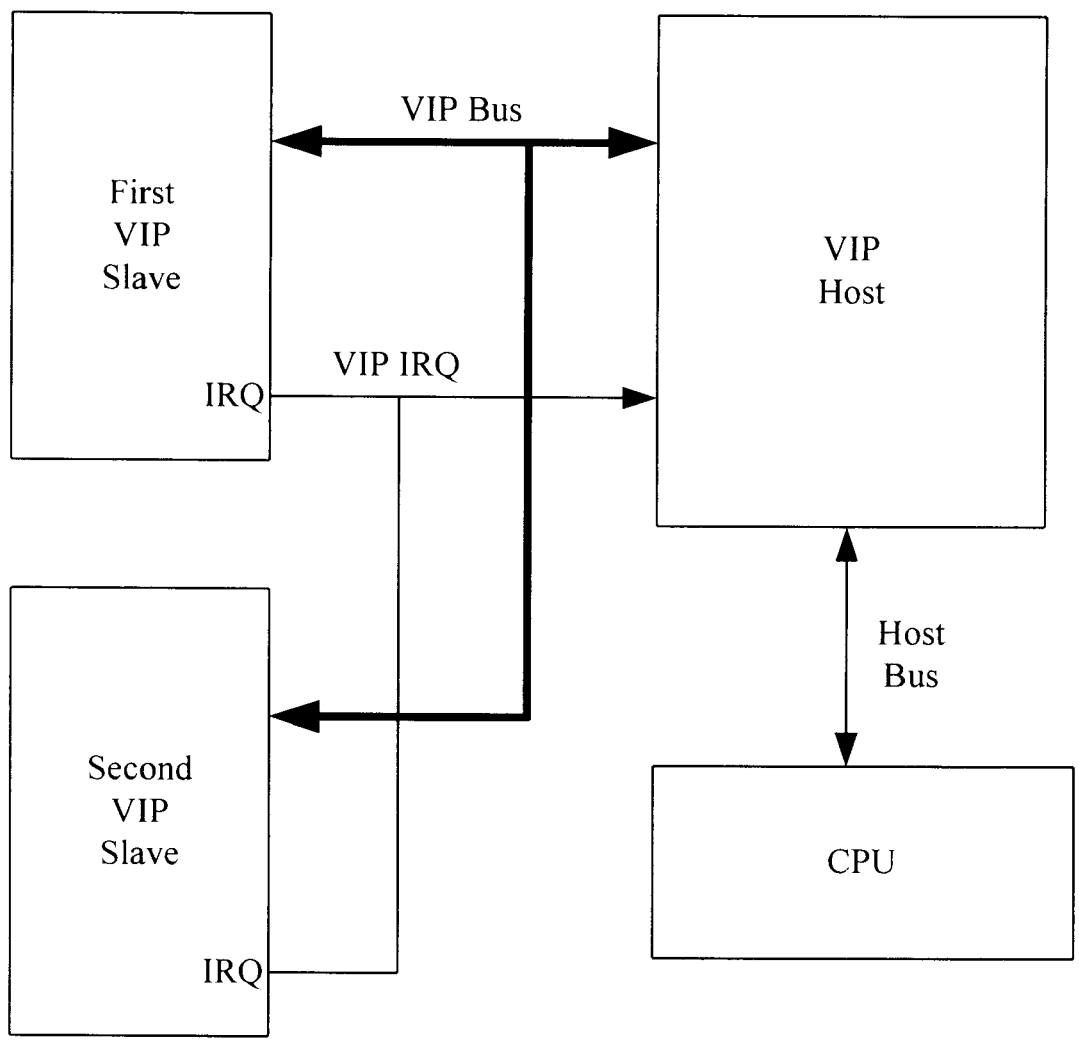
FIG. 1 illustrates a block diagram of a prior art VIP system.
Figure 2:
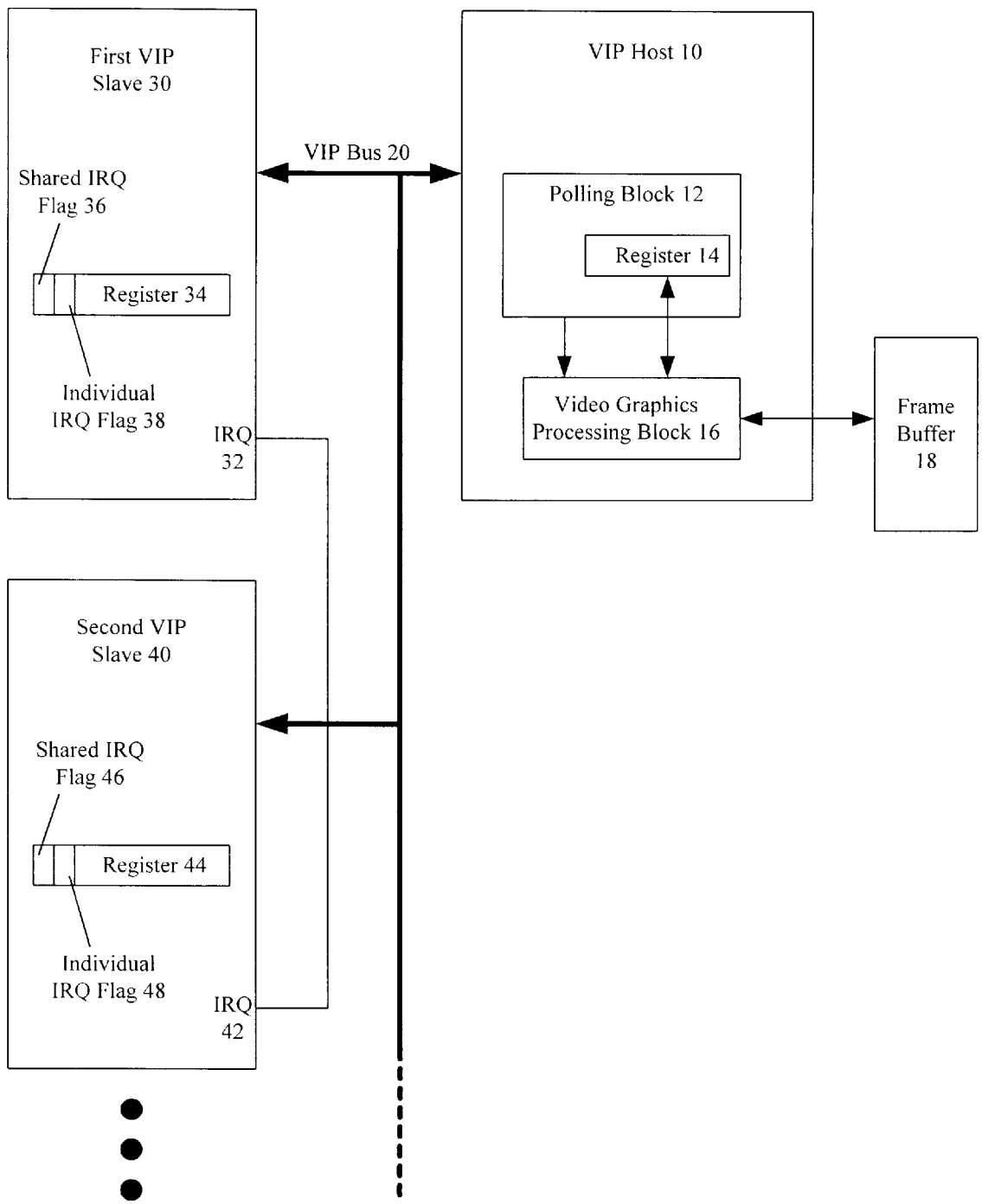
FIG. 2 illustrates a block diagram of a video graphics system in accordance with the present invention.
Figure 3:
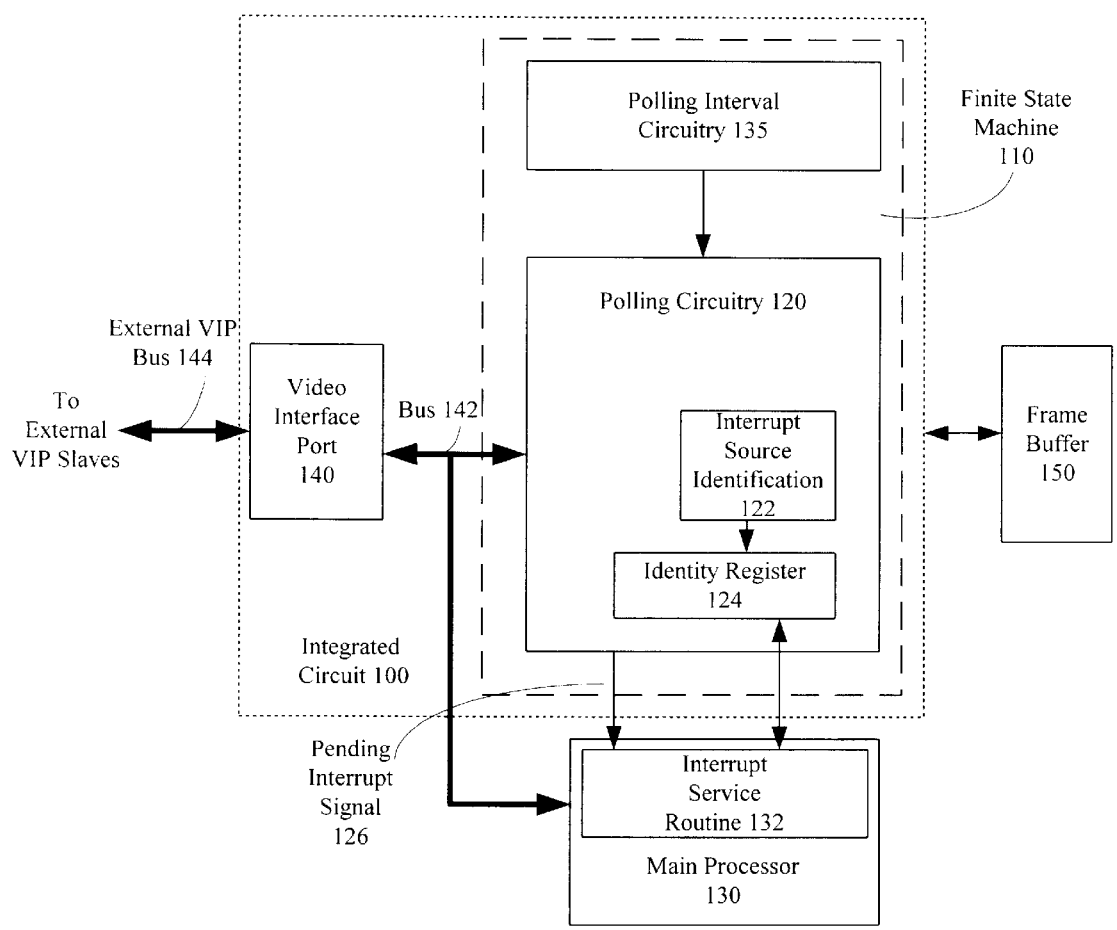
FIG. 3 illustrates a block diagram of an interrupt detection circuit in accordance with the present invention.
Figure 4:
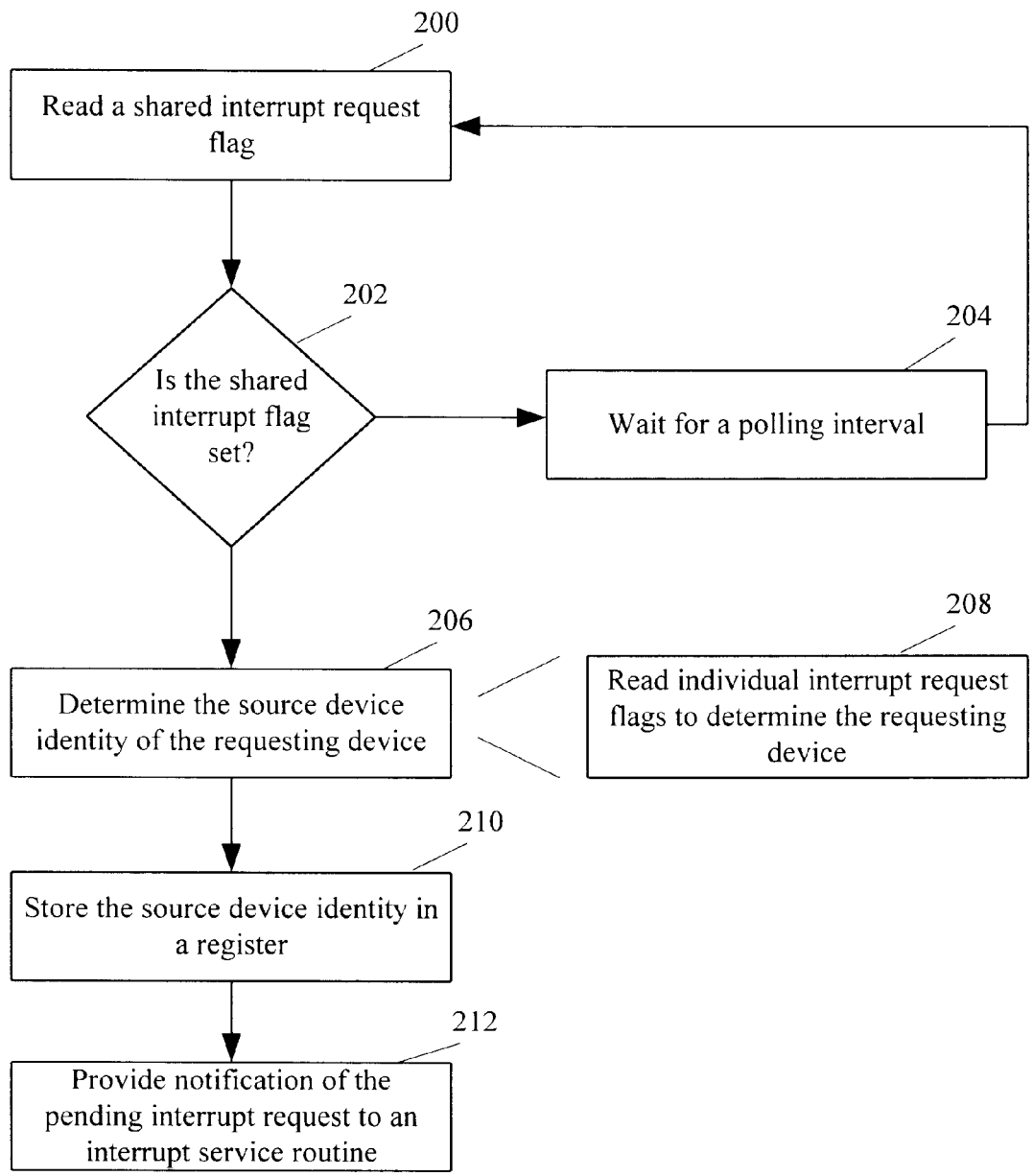
FIG. 4 illustrates a flow chart of the method for detecting an interrupt request in accordance with the present invention.

The invention can be better understood with reference to FIGS. 2–4. FIG. 2 illustrates a video graphics system that includes a VIP host 10, a first VIP slave 30, a second VIP slave 40, and a VIP bus 20. The VIP bus 20 couples the VIP host 10 to the VIP slaves 30 and 40. Preferably, the VIP host 10 and the VIP slaves 30 and 40 interact with the VIP bus 20 and each other in a manner consistent with the VIP standard issued by VESA. More preferably, these entities interact according to the VIP standard version 2 issued by VESA on Oct. 21st, 1998. The details of the VIP standard are incorporated herein by reference.

The VIP bus 20 carries data and control information between the VIP host 10 and the VIP slaves 30 and 40. Each of the VIP slaves devices coupled to the VIP bus 20 includes an interrupt request (IRQ) signal, which is present on an output pin of each slave device according to the VIP standard. Thus, the first VIP slave 30 includes IRQ pin 32, and the second VIP slave 40 includes IRQ pin 42. Note that the IRQ pins of the various VIP slaves in a system are preferably coupled together. In prior art systems, these IRQ pins are often tied together to form a single interrupt request signal that is provided directly to the VIP host 10, either via a PCI or AGP-type bus, or to a dedicated pin on the VIP host. When one of the VIP slave devices asserts its corresponding interrupt request signal, all of the VIP slave devices coupled to that interrupt request signal set a shared interrupt request flag. Preferably, the shared interrupt request flag for each of the slave devices is included in a register such as a status register.

For example, if the first VIP slave device 30 asserts the interrupt request pin 32, it stores a value in the register 34 at the location of the shared IRQ flag 36 which indicates that the interrupt signal has been asserted and a pending interrupt request exists. The second VIP slave 40 receives an indication of the first slave's interrupt request via the IRQ pin 42 and sets the shared IRQ flag 46 in its register 44.

In order to facilitate determining which of the VIP slaves is asserting an interrupt request, each of the VIP slaves may also include an individual IRQ flag. The individual IRQ flag is set when a particular VIP slave asserts its corresponding IRQ signal. For example, when the first VIP slave 30 asserts the IRQ signal 32, it sets its individual IRQ flag 38 as well as its shared IRQ flag 36. Preferably, the individual IRQ flag is also stored in a register within the slave device. The individual IRQ flag and the shared IRQ flag may or may not be stored within the same register within the device. Note that when the first VIP slave 30 asserts the IRQ pin 32, the second VIP slave does not set its individual IRQ flag 48, but does set its shared IRQ flag 46.

The VIP host 10 includes a video graphics processing block 16, which processes video data stored in a frame buffer 18 for display. Preferably, the frame buffer 18 is located external to the integrated circuit on which the VIP host 10 is disposed. However, it should be apparent to one of ordinary skill on the art that the frame buffer 18 may be included on the integrated circuit which contains the VIP host device 10.

The VIP host 10 also includes a polling block 12, where the polling block 12 reads the shared interrupt request flag of one of the VIP slave devices to determine if an interrupt request is pending. Preferably, the polling block 12 reads the interrupt request flags of VIP slave devices by accessing the register containing the interrupt request flags via the VIP bus 20. In order to accomplish this, the polling block 12 preferably includes address generation circuitry and control signal generation circuitry that generates the required signals to access the registers of the VIP slaves. When the polling block 12 determines that an interrupt request is pending, the polling block 12 notifies the video graphics processing block 16, which notifies an interrupt service routine (ISR) that services the pending interrupt request.

Prefereably, the polling block 12 is implemented as a state machine within the VIP host 10. By implementing the polling block 12 as separate circuitry from the video graphics processing block 16, the performance of the video graphics processing block 16 is not degraded by having to perform the polling functions. Because the operations performed by the polling block 12 are quite simplistic, the amount of circuitry required to implement a state machine capable of performing these functions is minimal. Thus, the overhead added to the VIP host 10 in terms of circuitry to perform the polling functions is relatively small.

In order to determine if an interrupt request is pending by any one of the VIP slave devices, the VIP host 10 only needs to read the shared IRQ flag of one of the slave devices. This is because when any VIP slave device asserts an interrupt request, all of the VIP slave devices will set their shared IRQ flag. Thus, the VIP host 10 can continuously poll a single one of the VIP slave devices to determine when an interrupt request is pending by any one of the VIP slave devices.

Once the polling block 12 has determined that an interrupt request is pending, it may simply notify the interrupt service routine of the video graphics processing block 16, and allow the interrupt service routine to determine which of the VIP slaves is asserting the interrupt request. However, in order to facilitate servicing of the interrupt requests, the polling block may further determine which of the VIP slaves is asserting the interrupt request before it signals the interrupt service routine, In order to accomplish this, the polling block 12 issues additional command and address information to the VIP bus 20 to read each of the individual IRQ flags of the VIP slave devices to determine which of the VIP slaves is asserting the interrupt request. When the polling block 12 determines that an individual IRQ flag in one of the VIP slave devices is set, it has located a VIP slave device that is asserting an interrupt request. Once this has been determined, the polling block 12 can signal the interrupt service routine with the notification of the pending interrupt request and the location or identity of the VIP slave asserting the request.

In a system that includes two VIP slaves, the polling block 12 will need to query only one individual IRQ flag to determine which of the two VIP slaves is asserting the IRQ signal. For example, if the polling block 12 reads the shared IRQ flag 36 of the first VIP slave 30 and detects that an interrupt request is pending based on a set shared IRQ flag 36, the polling block 12 may simply determine whether or not the individual IRQ 38 of the first VIP slave 30 is set to determine which VIP slave is asserting the interrupt request. If the individual IRQ flag 38 of the first slave device 30 is set, the first slave device 30 is asserting the interrupt request. If the individual IRQ flag 38 of the first VIP slave device 30 is not set, the polling block 12 can deduce that the second VIP slave 40 must be asserting the interrupt request. It should be obvious to one of ordinary skill in the art that a subset of the individual IRQ flags of a number of VIP slaves can be read to determine which of the VIP slaves is asserting the interrupt request.

Once the polling block 12 has determined the identity of the interrupting slave device, the polling block 12 may store the identity of the interrupting slave in a register 14. Once the polling block 12 notifies the video graphics processing block 16 that an interrupt request is pending by one of the VIP slaves, the interrupt service routine of the video graphics processing block 16 can access the register 14 to determine the identity of the interrupting slave.

The system illustrated in FIG. 2 includes two VIP slave devices 30 and 40. It should be apparent to one of ordinary skill in the art that a plurality of VIP slave devices may be included in such a system, where each of the VIP slave devices includes an individual IRQ flag and a shared IRQ flag, and where each of the VIP slaves is coupled to the VIP host 10 via the VIP bus 20. Typically, VIP systems are limited to four VIP slaves, as is described in the VIP standard. Similarly, it should be understood that the apparatus described herein would work with a single VIP slave as well as with many VIP slaves.

By including the polling block 12 within the VIP host 10, the VIP host 10 is able to determine when one of the VIP slave devices has issued an interrupt request without including a dedicated pin or wasting valuable processing bandwidth. By including a register 14 in which the polling circuitry stores the identity of the interrupting slave device, the VIP host 10 is able to offload some of the interrupt request processing required in prior art devices. Prior art circuits typically detected the presence of an interrupt request, but forced interrupt service routines to determine the source of the interrupt request. In some prior art cases, the interrupt service routines were required to access a number of devices in addition to the VIP slaves to determine the source of an interrupt request. This is because the interrupt request received by the VIP host 10 might be shared between VIP slave devices and other devices in the video graphics system.

In another embodiment that does not conform to the current VESA VIP standard, but which might be useful in other applications, each of the slave devices may simply include an individual IRQ flag. In such an embodiment, the polling circuitry would be required to poll all of the individual IRQ flags periodically to determine if an interrupt request was pending. When a set flag is detected in such a system, the polling circuitry would immediately know the identity of the interrupting slave, and could pass this information to the interrupt service routine.

FIG. 3 illustrates an interrupt detection circuit that may be utilized in a variety of systems that include interrupts to indicate the need for service. Thus, although the interrupt detection circuit of FIG. 3 is preferably included in a video graphics integrated circuit 100, it is understood that the system described may be utilized in other non-graphics applications. The interrupt detection circuit of FIG. 3 includes a bus 142 coupled to an external port 140, which may be a VIP port 140, and polling circuitry 120.

The bus 142 which is coupled to the external port 140 allows data external to the interrupt detection circuit to be accessed. Preferably, the external port 140 is a VIP port coupled to an external VIP bus 144 that is coupled to one or more external VIP slave devices. In such a configuration, the bus 142 provides the polling circuitry 120 a means to access data such as flags stored within the external VIP slaves.

The polling circuitry 120 provides a first set of address and control information to the bus 142 such that the bus determines the state of an interrupt request flag external to the interrupt detection circuit. Preferably, the polling circuitry 120 asserts these signals on the bus 142 such that they are relayed via the external port 140 to the external bus 144 which accesses the interrupt request flag in one of the external VIP slave devices, and relays the status of such a flag back to the polling circuitry 120. More preferably, the external VIP slave devices include registers such as those illustrated in FIG. 2 that include shared and individual interrupt request flags. It should be noted that the external port 140 may simply include the external pins of the integrated circuit 100 such that the bus 142 is effectively an internal version of the external VIP bus 144. In other embodiments, the port 140 may include circuitry to facilitate usage of the VIP bus 144.

The polling circuitry 120 determines if the interrupt request flag, which is preferably a shared interrupt request flag, is set. When the polling circuitry 120 determines that the interrupt request flag is set, it indicates a pending interrupt such that the interrupting device will be serviced. Preferably, the pending interrupt is indicated via a pending interrupt signal 126, which is provided to the interrupt service routine 132 of a main processing entity 130. In order for the polling circuitry 120 to periodically query the external interrupt request flags, polling interval circuitry 135 is included in the system. The polling interval circuitry 135 is operably coupled to the polling circuitry and indicates a polling interval, where the polling circuitry 120 issues the address and control information required to check the interrupt request flag at intervals corresponding to the polling interval. The polling interval circuitry 135 may be implemented using a counter, or a similar device that is able to determine a suitable time interval for polling. The polling time may be based on considerations such as the available bus bandwidth, maximum latency between interrupt assertion and detection, and other system performance considerations.

As in FIG. 2, the polling circuitry 120 may include an interrupt source identification block 122 that provides additional address and control information to the bus 142 such that the bus returns individual interrupt request flags, which allow the polling circuitry to pinpoint the external device asserting the interrupt request. Each of the individual interrupt request flags corresponds to a device of a plurality of devices, which preferably are VIP slaves. When an individual interrupt request flag corresponding to a selected device is set, the selected device is asserting an interrupt request.

In order to determine which of the plurality of external devices is asserting the interrupt request, the interrupt request source identification circuitry 122 performs successive accesses to individual interrupt request flags of the plurality of devices to determine the identity of the selected device asserting the interrupt request. Thus, the interrupt source identification block 122 may perform a number of accesses to a number of individual interrupt request flags to determine which of the external devices is asserting the interrupt. Once the interrupt source identification circuitry 122 has determined which of the plurality of devices is asserting the interrupt, it preferably includes this information in its notification to the interrupt service routine 132. More preferably, the interrupt source identification block 122 stores the identity of the device asserting the interrupt request in the identity register 124. When the interrupt service routine 132, which may be implemented in software within the main processor 130, receives notification of the pending interrupt, the interrupt service routine 132 can access the identity register 124 to determine which of the plurality of devices needs service.

Because the additional overhead required to implement the polling functionality may have a detrimental effect on the graphics processing capabilities of a graphics processing chip, the polling interval circuitry 135 and the polling circuitry 120 are preferably implemented using a finite state machine I 10. By implementing this circuitry within a state machine 110, the polling can be accomplished with minimal additional circuitry and also without placing additional loading on the limited processing bandwidth of the main processor 130.

The interrupt detection circuit illustrated in FIG. 3 may also include a frame buffer memory 150 operably coupled to the video graphics integrated circuit 100. The frame buffer memory 150 preferably stores video information for processing and display. Typically, the VIP slave devices in a video graphic system will interact with the frame buffer memory 150 via the VIP port 140 of the video graphics integrated circuit 100.

By polling external devices in order to determine when an interrupt request is pending, the presence of a pending interrupt request can be relayed to the interrupt service routine of a system without requiring one or more dedicated pins connected to the interrupt request signals of the plurality of devices. Similarly, the polling of the external devices allows the identity of the device asserting an interrupt request to be determined with minimal interaction on the part of the interrupt service routine. These advantages over prior art systems can be significant in systems having a limited pin count and which require minimal delay by an interrupt service routine prior to servicing of an interrupt request.

FIG. 4 illustrates a flow diagram of a method for detecting an interrupt request. As before, the method illustrated in FIG. 4 may be applicable to other systems, but is preferably implemented in a video graphics environment that includes VIP slave and host devices.

At step 200, a shared interrupt request flag of a first device is read. At step 202, it is determined if the shared interrupt request flag is set. If the shared interrupt request flag is determined not to be set at step 202, the method proceeds to step 204 where a wait state is entered for a predetermined or dynamic polling interval. Once the polling interval has expired, the method proceeds back to step 200 where the shared interrupt request flag is once again read to determine if it is set. The polling interval may be determined based on a number of considerations including the amount of bandwidth of the bus coupling the VIP slaves to the VIP host that can be dedicated to the polling of the VIP slave interrupt request flags, or based on other system performance considerations. The polling interval may be changed during operation to adjust to the needs of a specific system.

If it is determined at step 202 that the shared interrupt request flag is set, the method proceeds to step 206. A set shared interrupt request flag indicates that a pending interrupt request exists. As was illustrated in FIG. 2, a shared interrupt request flag is a flag that is set whenever any one of the VIP slave devices in a system is asserting an interrupt request. Thus, at this point in the method it is determined that a pending interrupt does exist. In some systems, this may be adequate, and the method may then proceed to provide notification of the pending interrupt to an interrupt service routine. However, it is preferable that additional steps take place to identify the source of the interrupt request.

At step 206, the source device identity of the requesting device is determined. The source device identity identifies a requesting device of the plurality of devices that is asserting the interrupt request corresponding to the pending interrupt request. Step 206 may include step 208, at which the individual interrupt request flags of one or more of the plurality of devices is read to determine the identity of the requesting device. As was described in FIG. 2, this may require reading the individual interrupt request flags of a number of the plurality of devices to determine which of the plurality of devices has asserted the interrupt request. The reading of the individual interrupt request flag and the shared interrupt request flag may be accomplished by reading a status register within each of the plurality of devices, where the status register includes the individual interrupt request flag and the shared interrupt flag.

Once the source device identity of the requesting device has been determined, this information is relayed to the interrupt service routine. Preferably, this is accomplished at step 210 by storing the source device identity in a register, where the interrupt service routine is able to access the register to determine the source device identity. Providing the source device identity to the interrupt service routine facilitates servicing of the pending interrupt request by allowing the interrupt service routine to avoid the requirement of locating the source of the interrupt request. At step 212, notification of the pending interrupt request is provided to the interrupt service routine, which then services the requesting device.

The dedicated polling circuitry and method for polling described herein allows interrupts to be detected in video graphics and other systems in a manner that does not require dedicated pins. In addition to this, implementing the circuitry as a finite state machine or other self-directed block allows interrupts to be detected by polling without placing a significant burden on the main processor of the polling circuit. These advantages allow cost-efficient systems to be implemented without compromising system performance.

It should be understood that the implementation of variations and modifications of the invention and its various aspects will be apparent to those of ordinary skill in the art, and that the invention is not limited to the specific embodiments described. For example, each slave device may include a plurality of interrupts, each of which has a corresponding interrupt flag that is set when the interrupt is asserted. In such embodiments, the polling circuitry could examine each of the flags to determine both the source of the interrupt and the type of interrupt being asserted. It is therefore contemplated to cover by the present invention, any and all modifications, variations, or equivalence that fall within the spirit and scope of the basic underlying principles disclosed and claimed herein.

What is claimed is:

1. A method for detecting an interrupt request comprising the steps of:
    reading a shared interrupt request flag stored in a first device of a plurality of devices, wherein, when one of the plurality of devices asserts an interrupt request, the interrupt request is indicated by a state of a corresponding shared interrupt request flag stored in each of the plurality of devices;
    determining whether a pending interrupt request exists based on a state of the shared interrupt request flag of the first device; and
    in the event that a pending interrupt request exists, providing notification of the pending interrupt request to an interrupt service routine.

2. The method of claim 1, further comprising the steps of:
    in the event that a pending interrupt request does not exist
    waiting for a polling interval; and
    after the polling interval has expired, repeating the steps of reading, determining and providing.

3. The method of claim 1, wherein the step of determining whether a pending interrupt exists comprises the step of determining whether the shared interrupt request flag of the first device is set.

4. The method of claim 1, further comprising the step of determining a source device identity, wherein the source device identity identifies a requesting device of the plurality of devices that is asserting the pending interrupt request.

5. The method of claim 4, further comprising the step of storing the source device identity in a register, wherein the interrupt request service routine accesses the register to facilitate servicing of the pending interrupt request.

6. The method of claim 5, wherein determining the source device identity further comprises the step of reading individual interrupt request flags in successive devices of the plurality of devices until an individual interrupt request flag is detected that indicates a particular device is asserting the pending interrupt request.

7. The method of claim 6, wherein the step of reading the individual interrupt request flags comprises the step of reading a status register in each device of the successive devices, wherein the status register of each device of the successive devices includes a respective individual interrupt request flag, and wherein the step of reading the shared interrupt request flag comprises the step of reading a status register in the first device, wherein the status register of the first device includes at least the shared interrupt request flag.

8. An interrupt detection circuit comprising:
a bus coupled to an external port, wherein the bus allows data external to the interrupt detection circuit to be accessed;
polling circuitry operably coupled to the bus, wherein the polling circuitry provides address and control information to the bus to allow the polling circuitry to determine a state of a shared interrupt request flag stored in a first device of a plurality of devices located external to the interrupt detection circuit, wherein, when one of the plurality of devices asserts an interrupt request, the interrupt request is indicated by a state of a corresponding shared interrupt request flag stored in each of the plurality of devices, and wherein pending interrupt request exists when the polling circuitry determines that the shared interrupt request flag of the first device is in a particular state.

9. The interrupt detection circuit of claim 8, further comprising polling interval circuitry operably coupled to the polling circuitry, wherein the polling interval circuitry indicates a polling interval, and wherein the polling circuitry provides address and control information at intervals corresponding to the polling interval.

10. The interrupt detection circuit of claim 9, wherein the polling circuitry further comprises interrupt request source identification circuitry, wherein the interrupt request source identification circuitry provides additional address and control information to the bus to allow the interrupt request source identification circuitry to read individual interrupt request flags of the plurality of devices, wherein each of the individual interrupt request flags corresponds to a respective device of the plurality of devices, wherein, when an individual interrupt request flag corresponding to a particular device is set, the particular device is asserting an interrupt request, and wherein the interrupt request source identification circuitry performs successive accesses to the individual interrupt request flags of the plurality of devices to determine an identity of the particular device asserting the interrupt request.

11. The interrupt detection circuit of claim 10, wherein the interrupt request source identification circuitry stores the identity of the particular device a asserting the interrupt request in an identity register.

12. The interrupt detection circuit of claim 11, wherein the polling circuitry indicates the pending interrupt request by signaling an interrupt service routine, wherein the interrupt service routine accesses the identity register in order to facilitate servicing of the particular device.

13. The interrupt detection circuit of claim 9, wherein the polling circuitry and the polling interval circuitry are included in a video graphics integrated circuit.

14. The interrupt detection circuit of claim 13, wherein the polling circuitry and the polling interval circuitry are included in a finite state machine external to a main processor within the video graphics integrated circuit.

15. The interrupt detection circuit of claim 14, wherein the external port is a video interface port, and wherein the video graphics integrated circuit is configured to couple to a plurality of video interface port slave devices via the video interface port.

16. The interrupt detection circuit of claim 15, further comprising a frame buffer memory operably coupled to the video graphics integrated circuit, wherein the plurality of video interface port slave devices interact with the frame buffer memory via the video interface port of the video graphics integrated circuit.

17. A video graphics system comprising:
a video interface port bus that carries data and control information;
a plurality of video interface port slave devices operably coupled to the video interface port bus, wherein the plurality of video interface port slave devices are coupled to each other via an interrupt request signal, wherein each of the plurality of video interface port slave devices includes a shared interrupt request flag, and wherein assertion of the interrupt request signal be one of the plurality of video interface port slave devices is indicated by a state of the shared interrupt request flag of each of the plurality of video interface port slave devices; and
a video interface port host operably coupled to the video interface port bus, wherein the video interface port host includes:
a video graphics processing block, wherein the video graphics processing block processes video data stored in a frame buffer for display; and
a polling block, wherein the polling block reads the shared interrupt request flags of one of the plurality of video interface port slave devices to determine whether an interrupt request is pending, and wherein, when an interrupt request is pending the polling block notifies the video graphics processing block.

18. The video graphics system of claim 17, herein the polling block determines that an interrupt request is pending when the shared interrupt request flag of one of the plurality of video interface port slave devices is set.

19. The video graphics system of claim 17, wherein each of the plurality of video interface port slave devices further includes an individual interrupt request flag, wherein, when one of the plurality of video interface port slave devices asserts the interrupt request signal to become an interrupting slave device, the individual interrupt request flag corresponding to the interrupting slave device is set.

20. The video graphics system of claim 19, wherein the polling block further includes circuitry such that when the polling block detects an interrupt request is pending based on assertion of the interrupt request signal by reading the shared interrupt request flag of one of the plurality of video interface port slave devices, the polling block reads the individual interrupt request flag of at least one of the plurality of video interface port slave devices to determine an identity of the interrupting slave device.

21. The video graphics system of claim 20, wherein the polling block provides the identity of the interrupting slave device to the video graphics processing block.

22. The video graphics system of claim 20, wherein the polling block stores the identity of the interrupting slave device in a register that is accessible by the video graphics processing block.

* * * * *